United States Patent [19]

Japka

[11] Patent Number: 5,326,640
[45] Date of Patent: Jul. 5, 1994

[54] MICROWAVE ABSORBING ARTICLE

[75] Inventor: Joseph E. Japka, Lincoln Park, N.J.

[73] Assignee: ISP Investments Inc., Wilmington, Del.

[21] Appl. No.: 945,454

[22] Filed: Sep. 16, 1992

[51] Int. Cl.⁵ ............................................. B32B 5/16
[52] U.S. Cl. ................................. 428/403; 252/513; 252/519; 428/406; 428/433; 428/655; 428/683
[58] Field of Search ............... 428/403, 406, 433, 913, 428/655, 683; 252/513, 519

[56] References Cited

U.S. PATENT DOCUMENTS

| | | | |
|---|---|---|---|
| 3,846,345 | 11/1974 | Mason et al. | 252/514 |
| 4,137,361 | 1/1979 | Deffeyes et al. | 428/328 |
| 4,199,614 | 4/1980 | Ziolo | 428/406 X |
| 4,522,890 | 6/1985 | Volkors et al. | 428/624 |
| 4,579,882 | 4/1986 | Kanbe et al. | 523/137 |
| 4,618,525 | 10/1986 | Chamberlain et al. | 428/209 |
| 4,624,798 | 11/1986 | Gindrup et al. | 428/403 X |
| 4,624,865 | 11/1986 | Gindrup et al. | 428/403 X |
| 4,818,607 | 4/1989 | Rickborn et al. | 428/323 |
| 5,085,931 | 2/1992 | Boyer, III et al. | 428/328 |

Primary Examiner—Paul J. Thibodeau
Assistant Examiner—H. Thi Le
Attorney, Agent, or Firm—Marilyn J. Maue; Walter Katz; Joshua J. Ward

[57] ABSTRACT

A microwave absorbing article of low density comprises a hollow or solid glass microsphere having a diameter of 1-100 microns, and, deposited thereon, a succession of layers of particulate iron material interspersed by a passivated iron skin.

8 Claims, No Drawings

MICROWAVE ABSORBING ARTICLE

BACKGROUND OF THE INVENTION

1. Field of the Invention

This invention relates to microwave absorbing materials, and, more particularly, to iron-coated materials which have effective microwave absorption properties and low densities.

2. Description of the Prior Art

Typically, microwave absorbing coatings containing carbonyl iron powder (CIP) on substrates have powder loadings in excess of 80% by weight of the coating. However, in many applications, for example, in airplanes, it would be advantageous to provide microwave absorbing materials having a low density.

Accordingly, it is an object of this invention to provide microwave absorbing materials having effective microwave absorption properties and low densities.

SUMMARY OF THE INVENTION

What is provided herein is a microwave absorbing article of low density which comprises a hollow or solid glass microsphere having a diameter of 1-100 microns, and, deposited thereon, a succession of layers of particulate iron material interspersed by a passivated iron skin.

The article of the invention is made by a fluid bed process which comprises the steps of:

(a) fluidizing a plurality of hollow or solid glass microspheres having a diameter of 1-100 microns in an inert gas stream, (b) heating said fluidized glass microspheres in an inert gas stream containing ammonia at a predetermined temperature to remove surface water therefrom while attaching ammonia thereto, (c) contacting said treated microspheres with iron pentacarbonyl at a predetermined concentration in said fluidizing gas stream at a selected temperature and for a sufficient period of time to deposit a first layer of particulate iron on said microspheres, (d) fluidizing the iron-layered glass microspheres with air to provide a passivated iron skin thereon, and (e) repeating steps (c) and (d) at least two times to build-up additional iron layers interspersed with a passivated iron skin until the total thickness of the successive iron layers formed is about 1-3 microns.

DETAILED DESCRIPTION OF THE INVENTION

In accordance with the invention, the substrate upon which the desired layers are coated is a solid or hollow borosilicate glass microsphere (Patter Industry, Inc., Parsippany, N.J.) having an average particle size of about 1-100 microns, preferably about 3-25 microns and a density of about 2.2-2.4 g/cc. The hollow glass microspheres usually have a wall thickness of about 0.9 microns.

These glass microspheres then are loaded into a fluid bed reactor such as described in "*Gas-Liquid-Solid Fluidization Engineering*" by L. Fan (Butterworths, 1989), and fluidized at room temperature in an inert atmosphere of nitrogen or argon containing about 10% of ammonia.

The fluidized glass beads then are heated to about 300° C. during about an hour to drive-off any water on the surface of the beads. The function of the ammonia is to attach itself to the dehydrated glass surface to prevent moisture from reattaching, and to act as a catalytic surface for the decomposition of iron pentacarbonyl.

The thus-treated fluidized glass beads then are cooled to about 250° C. while introducing a reaction mixture of about 1% iron pentacarbonyl into the fluidizing atmosphere. Then the concentration of the iron carbonyl is slowly raised to about 5% and the reaction mixture is held at this temperature for about 5-8 hours to deposit the first layer of particulate iron on the glass beads.

The iron-coated glass beads then are cooled to below 30° C. while fluidizing with nitrogen gas; then air is introduced to continue the fluidization process and, during a period of contact of about 5-10 minutes, to passivate the iron surface. Thereafter the steps of iron deposition and passivation are repeated at least two times, preferably 3-4 times, to build-up the total thickness of the deposites to about 1-3 microns.

In application as a microwave absorbing material, the article of the invention exhibits excellent microwave absorbing properties, and with substantially reduced power loadings as compared to conventional iron-coated articles designed for the same use.

While the invention has been described with particular reference to certain embodiments thereof, it will be understood that changes and modifications may be made which are within the skill of the art. Accordingly, it is intended to be bound only by the following claims, in which:

What is claimed is:

1. A microwave absorbing article of predetermined density comprising a hollow or solid glass microsphere having a diameter of 1-100 microns, and, deposited thereon, alternating layers of elemental iron material and passivated elemental iron in that order said article including at least two layers of iron and two layers of passivated iron in which the total thickness of the deposited iron layers if about 1-3 $\mu$m.

2. An article according to claim 1 wherein said glass microspheres are hollow glass beads.

3. An article according to claim 2 wherein said hollow glass beads have a wall thickness of about 0.9 microns.

4. An article according to claim 1 wherein said glass microspheres are solid glass beads.

5. An article according to claim 4 wherein said solid glass beads have a density of about 2.2-2.4 g/cc.

6. An article according to claim 4 in which said solid glass beads have a diameter of about 3-25 microns.

7. An article according to claim 4 in which the total thickness of the deposited iron layers is about 1-2.0 microns.

8. An article according to claim 1 wherein said glass microspheres are borosilicate glass microspheres.

* * * * *